United States Patent

[11] 3,613,970

[72] Inventor Robert F. Humlong
Maysville, Ky.
[21] Appl. No. 23,711
[22] Filed Mar. 30, 1970
[45] Patented Oct. 19, 1971
[73] Assignee Wald Manufacturing Company, Inc.
Maysville, Ky.

[54] MOUNTING MEANS FOR BICYCLE BASKETS
14 Claims, 7 Drawing Figs.
[52] U.S. Cl. .................................................. 224/36
[51] Int. Cl. .................................................. B62j 7/06
[50] Field of Search .......................................... 224/36, 35,
30, 41, 32, 33, 30.36

[56] References Cited
UNITED STATES PATENTS
2,331,211 10/1943 Lyman .......................... 224/36
3,140,025 7/1964 Persons ......................... 224/36

Primary Examiner—Gerald M. Forlenza
Assistant Examiner—John Mannix
Attorney—J. Warren Kinney, Jr.

ABSTRACT: The bicycle basket receives support solely from the "high-rise" handlebar, and is suspended in part below the level of the steering post so as to lower the center of gravity of the basket and its contents. The basket mounting means and the basket itself are simplified, and involve no cutting or weakening of the basket frame wires.

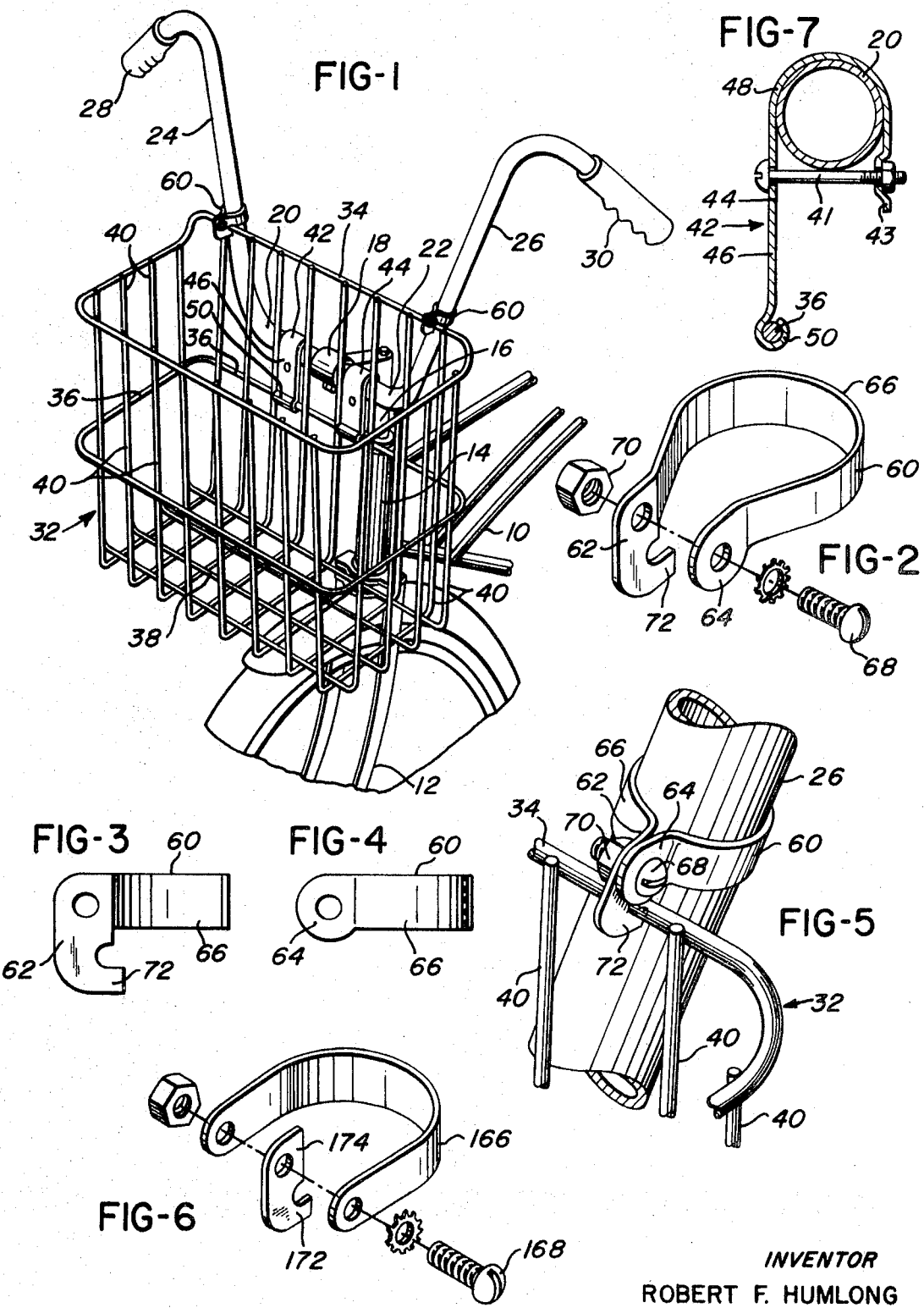

MOUNTING MEANS FOR BICYCLE BASKETS

The present invention relates to mounting means for a bicycle basket, and particularly that form of basket which is supported by the presently popular "high-rise" style of bicycle handlebar.

In mounting a basket on the handlebar, it is desirable to avoid any connection between the basket mounting means and the front wheel axle of the bicycle. Thus, it is unnecessary to remove and replace the axle nuts, with the possible risk of disturbing the wheel alignment and cone adjustments, or possible failing to retighten the axle nuts and thereby creating a hazardous situation. These considerations are important in view of the fact that many bicycle owners are quite young and may lack the mechanical aptitude necessary to partially disassemble and safely reassemble the axle mount.

Another important safety feature of the invention resides in the fact that the weight of any load carried by the basket is located close to the steering post of the bicycle, rather than substantially forward thereof according to conventional practice, with the result that steering is made easier and there is eliminated any tendency for the load to bias the steering toward one side or the other when the cyclist attempts to turn from a straight line direction of travel.

An object of the invention is to provide a basket mounting means of the character stated, whereby a basket is supported solely by the handlebar, and has no connection with the front wheel fork or axle of a bicycle.

Another object of the invention is to provide a high-rise handlebar basket mount which supports the basket as above specified, with any load carried being disposed at a relatively low elevation, so as to avoid a top-heavy weight situation and possible obstruction of the cyclist's line of vision.

Another object is to provide in an improved basket mount of the character stated, a novel arrangement of clamp means that fastens to the top frame wire of the basket while at the same time embracing the riser portion of the high-rise handlebar, the attachment procedure being simple, easy, and positive, to eliminate accidental displacement of the basket up or down or forwardly, and prevents sidesway of the basket relative to the handlebar.

The foregoing and other objects are attained by the means described herein and illustrated upon the accompanying drawing, in which:

FIG. 1 is a fragmental perspective view showing a basket mounted upon a high-rise handlebar in accordance with the present invention.

FIG. 2 is an exploded perspective view of an improved clamp utilized in the mounting means for the basket.

FIGS. 3 and 4 are cross sections taken on a vertical plan bisecting FIG. circular clamp band of FIG. 2.

FIG. 5 is a detail view in enlarged perspective, showing the clamp of FIG. 2 engaging the upper basket wire and the handlebar riser.

FIG. 6 is a view similar to Fig. 2, showing a modification of the clamp means.

FIG. 7 is a side elevational view of a weight suspender which forms part of the improved mounting means.

In the example illustrated, the bicycle comprises the usual frame 10, front fork 12, steering port housing 14, and steering post 16, said post having a contractable barrel 18 in which is clamped the middle portion of the handlebar flanked by the horizontal portions or branches 20, 22. The handlebar is of the type known as the "high-rise" type, wherein the riser portions 24, 26 extend a substantial distance upwardly and at a steep inclination from branches 20, 22, to terminate in grip ends 28, 30. The risers 24, 26 rest in a common plane which includes the branches 20, 22, and the inclination of said plane may be adjusted or varied at barrel 18 after loosening a screw or fastener carried by the barrel in usual manner.

The basket, generally denoted 32, may be constructed of stiff wires arranged in open-top box formation, the open top being defined by an upper circumferential wire frame 34. Frame 34 may be substantially rectangular, and should be of heavy gauge wire. A similarly shaped wire frame 36 may circumscribe the basket intermediate the upper wire frame and the bottom wall 38 of the basket. The bottom wall 38, frame 36, and frame 34, may be substantially parallel to one another, if desired, and may support a multiplicity of upright wires 40 which define a front wall, a rear wall, and opposite sidewalls of the basket. The rear wall is that wall which is closest to the post housing 14. Where the various wires intersect, they may be welded, brazed or otherwise joined to provide a rigid structure.

It may here be noted that the basket 32 is of a simple box design and construction, which is inexpensive to fabricate.

The weight of the basket and its contents is to be borne chiefly by a pair of hangers 42, 44, shaped from metallic strips according to Fig. 7. The strips are bent at their upper end to form a hook 48 adapted to overlie and embrace the horizontal portion 20 of the handlebar. The opposite or lower end of the strip is bent to provide a closed loop or hook 50 which securely engages the intermediate, horizontal basket-frame wire 36. A bolt 41 spans legs 43 and 46 of strips below handlebar portion 20 for securely though releasably suspending the basket from branches 20–22 of the handlebar. In a preferred embodiment of the invention the hangers may be secured to the heavy wire 36 of the basket rear wall by the manufacturer of the basket, however the hangers may also be applied to a basket as an attachment.

Both of the hangers 42 and 44 suspend the basket very close to the vertical plane of the horizontal portions or branches 20, 22 of the handlebar. The hangers depend at opposite sides of barrel 18, as shown.

The upper circumferential wire 34 at the basket rear wall, is adapted for attachment to the upwardly directed risers 24, 26 of the handlebar, at a distance above the horizontal portions or branches 20, 22. The means for effecting the attachment may consist of a pair of identical clamps 60, one of which is detailed in Figs. 2 through 5. An alternate clamp construction is illustrated by Fig. 6.

According to Figs. 2–5, the upper clamp or basket stabilizer 60 may comprise a metallic ribbon or strip having terminal ends 62, 64, and an intermediate portion curved to form a band 66 dimensioned to securely embrace the handlebar riser. The terminal ends 62, 64 are apertured to receive a clamping screw 68 having a nut 70 to draw the clamp ends together about the riser, so as to produce a firm mounting of the clamp upon the riser.

One of the clamp ends 62 may be developed to provide an integral hook 72 opening inwardly toward the axis of band 66, said hook being receptive of the upper circumferential wire 34 at the rear wall of the basket. When the clamp is tightened, with wire 34 engaged by hook 72, the wire 34 is brought into contact with riser 26 at right angles thereto so that the wire cannot recede from the hook, it being understood that hook 72 abuts or nearly abuts the riser. By this means, the risers at two locations provide for stabilizing of the basket against forward dipping bodily at the hangers 42, 44, without resort to any front fork or axle connection.

The same clamping effect may be obtained with the use of the Fig. 6 clamp, which incorporates a hook member 172 separate from band 166 but apertured to receive the clamping screw 168. The inner straight edge 174 of hook member 172 may abut the riser of the handlebar, to preclude rotation of the hook member about clamping screw 168.

It should be noted that the basket 32 rests against or upon no part of the bicycle other than the handlebar, and it has a low center of gravity such as will facilitate steering and balancing of the bicycle. The extent to which the support means limit forward extension of the basket, also facilitates steering and minimizes any tendency of the weight of the basket and its contents to objectionably swing the front wheel toward one side or the other when the bicycle is steered from a straight course.

What is claimed is:

1. A wire basket structure for mounting on a bicycle handlebar having opposed horizontal branch portions, spaced risers, and grip portions, said branch portions and risers being disposed substantially in a selected single plane, said basket including: a top defined by an upper circumferential wire frame; a bottom; and an intermediate wire frame spaced from said upper frame; spaced wires secured to said upper frame for providing a rear wall, a front wall, and opposed end walls for the basket; a pair of hangers each having an upper and a lower end portion, said upper end portions being bent to hook formation with the hook formations overlying and embracing the opposed branch portions of the handlebar; means on the lower end portions of the hangers to embrace the intermediate wire frame at the rear wall of the basket, with a substantial portion of the basket depending below the level of the handlebar branch portions; and clamp means for securing the upper circumferential wire frame to the risers between the branch portions and the grip portions of the handlebar.

2. The basket structure as defined by claim 1, wherein said intermediate wire frame is continuous and substantially coextensive with the front, rear, and end walls of the basket, and is secured to at least some of the spaced wires constituting said walls.

3. The basket structure as defined by claim 1, wherein said clamp means comprises a substantially circular metallic band having apertured terminal end portions receptive of a clamping screw, and hook means associated with said clamp means, to accommodate the wire of said upper frame and to urge said upper frame wire in the direction of said risers.

4. The basket structure as defined by claim 3, wherein said hook means last mentioned is integral with a terminal end portion of said band.

5. The basket structure as defined by claim 3, wherein said hook means last mentioned is a part separate from said band, and has an aperture therein receptive of said clamping screw.

6. The basket structure as defined by claim 4, wherein said intermediate wire frame is continuous and substantially coextensive with the width of said front, rear, and end walls of the basket, and is fixed to at least some of the spaced wires constituting said walls.

7. The basket structure as defined by claim 5, wherein said intermediate wire frame is continuous and substantially coextensive with the width of said front, rear, and end walls of the basket, and is fixed to at least some of the spaced wires constituting said walls.

8. The basket structure as defined by claim 3, wherein said hook means is substantially flat, and the plane thereof intersects at approximate right angles the aforesaid plane of the risers and branch portions of the handlebar.

9. The basket structure as defined by claim 1, wherein no wall of the basket abuts any part of the bicycle frame.

10. The basket structure as defined by claim 2, wherein no wall of the basket abuts any part of the bicycle frame.

11. The basket structure as defined by claim 2, wherein said hangers support mainly the weight of the basket and contents, whereas said clamp means restrain the basket top against forward tipping away from said handlebar risers.

12. The basket structure as defined by claim 3, wherein said hangers support mainly the weight of the basket and contents, whereas said clamp means restrain the basket top against forward tipping away from said handlebar risers.

13. The basket structure as defined by claim 12, wherein said hook means is substantially flat and is integral with a terminal end portion of said band, the plane of said hook means intersecting at approximate right angles the aforesaid plane of the risers and branch portions of the handlebar.

14. The basket structure as defined by claim 12, wherein said hook means is substantially flat and is a part separate from said band, and has an aperture therein receptive of said clamping screw, the plane of said hook means intersecting at approximate right angles the aforesaid plane of the risers and branch portions of the handlebar.